E. B. MOOMAW.
LINER FOR CYLINDERS.
APPLICATION FILED FEB 26, 1921.

1,437,904.

Patented Dec. 5, 1922.

WITNESSES

INVENTOR
Elvin B. Moomaw,
BY
ATTORNEYS

Patented Dec. 5, 1922.

1,437,904

UNITED STATES PATENT OFFICE.

ELVIN B. MOOMAW, OF JOPLIN, MISSOURI.

LINER FOR CYLINDERS.

Application filed February 26, 1921. Serial No. 447,976.

*To all whom it may concern:*

Be it known that I, ELVIN BARREN MOOMAW, a citizen of the United States, and a resident of Joplin, in the county of Jasper and State of Missouri, have invented certain new and useful Improvements in Liner for Cylinders, of which the following is a specification.

My invention relates to cylinders for engines, pumps, or the like, and the purpose of my invention is the provision of a liner for cylinders by means of which a scarred, cracked or broken cylinder can be restored to complete usefulness.

In carrying out my invention, I first bore out the damaged cylinder the required degree and then form a screw thread on the working wall, such thread if possible extending from one end of the cylinder to the other. A lining sleeve, preferably of the same material as the cylinder and of equal length, is exteriorly threaded throughout its length, and in such manner that it can be readily screwed into the cylinder. When the sleeve is screwed home in the cylinder, the inner wall of the sleeve which is subsequently finished, then serves as the working wall of the cylinder.

I am aware that it has hitherto been proposed to secure liners within damaged cylinders by shrinking the cylinder on the liner or by pressing the liner into the cylinder, but in these and similar methods, the cylinder unless made sufficiently substantial to withstand the strains incident to such methods, will invariably burst or crack.

My invention eliminates these possibilities and permits of the application of liners to cylinders irrespective of their thickness, because the threading operation subjects the cylinder to no strain whatever, thus allowing of the relining of cylinders whether they are designed for relining or not.

Any suitable means may be employed for retaining the sleeve in the cylinder against relative movement or displacement. I have found it expeditious and desirable, however, to permanently retain the sleeve within the cylinder by forming the threads of the sleeve and cylinder of the same pitch but of different angles so that in the applied position of the sleeve a continuous spiral channel is formed between the cylinder and sleeve for the reception of an adhesive material. It is desirable, although not necessary, that the threads of the cylinder be of the greater angle. Into this spiral channel I deposit cement or other suitable plastic composition which when set serves to permanently lock the threads together thus preventing movement or displacement of the liner.

Figure 1:
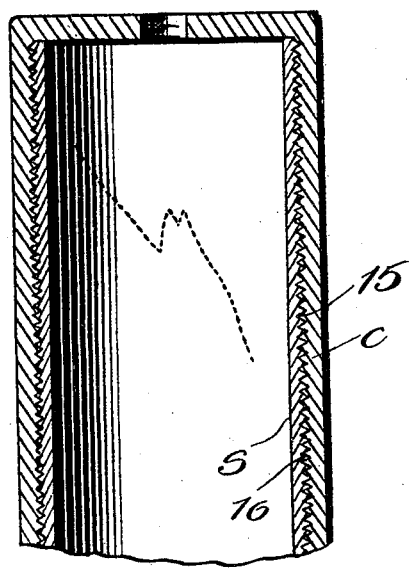
Figure 1 is a view showing in longitudinal section a cracked cylinder to which is applied a liner embodying my invention.
Figure 2:
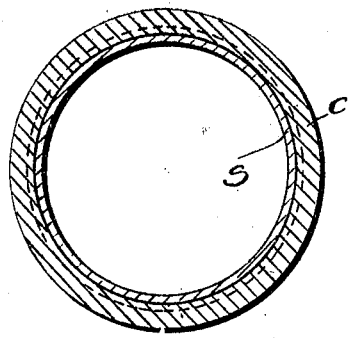
Figure 2 is a transverse sectional view of Figure 1.
Figure 3:
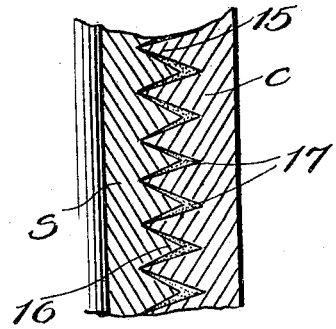
Figure 3 is an enlarged fragmentary sectional view of the cylinder and liner showing the formation of the threads and the application of the adhesive material thereto.

Referring specifically to the drawings, C designates the cylinder of an internal combustion engine, I having shown a cylinder of this type because my invention is particularly adapted, although not necessarily, to such use. The engine cylinder C is shown as cracked which obviously renders such a cylinder useless. 15 indicates the threads formed on the working wall of the cylinder in any suitable manner. In practice these threads are formed on those parts of the working wall which will provide a continuous and uninterrupted screw thread. Where cylinders which have portions of the working wall broken out, the screw threads are of necessity discontinued at these portions but are continued over the uninterrupted portions of the wall so that in the aggregate the threads of the working wall are sufficient to properly sustain the liner sleeve in the cylinder. The sleeve is indicated at S and is exteriorly threaded as indicated at 16. As shown in Figure 3, the angles of the threads 15 are greater than the angles of the threads 16 of the sleeve therefore it will be seen that a continuous spiral channel is formed between the cylinder and sleeve in which the adhesive material indicated at 17 is deposited. In practice, I employ cement as the adhesive material and this cement is placed within the threads of both the cylinder and sleeve before the latter is applied to the former so that when the sleeve has been screwed home the cement will be trapped within the channel and when set will lock the threads 15 and 16 together thereby preventing rotation of the sleeve and thus permanently locking the same within the cylinder.

The sleeve S is relatively thin so that its inner wall can be readily finished to provide the original bore of the cylinder, or a bore slightly in excess of the original when using the old piston. The finishing of the sleeve is preferably completed while the sleeve is within the cylinder, thus utilizing the cylinder to form a substantial support for the relatively thin sleeve and thereby eliminating the possibility of cracking or breaking the sleeve.

What I claim is:

1. In combination, an interiorly threaded cylinder, and a sleeve of the same external diameter throughout arranged within the cylinder, and exteriorly threaded throughout to engage the threads of the cylinder.

2. In combination, a cylinder interiorly threaded, a sleeve within the cylinder and exteriorly threaded, the threads of the sleeve and cylinder being of different angles to provide a channel between the two, and an adhesive material within the channel.

3. In combination, a cylinder interiorly threaded throughout its length, a sleeve of the same external diameter throughout arranged within the cylinder and exteriorly threaded, and means for locking the sleeve within the cylinder.

4. In combination, a cylinder interiorly threaded, a sleeve within the cylinder and exteriorly threaded, and means engageable with the threads of the cylinder and sleeve for locking the sleeve against displacement from the cylinder.

5. In combination, a cylinder interiorly threaded, a sleeve within the cylinder exteriorly threaded, and an adhesive material associated with the cylinder and sleeve for locking the latter against displacement from the former.

6. In combination, a cylinder interiorly threaded, and a sleeve within the cylinder and exteriorly threaded, the threads of the sleeve and cylinder being constructed to provide a channel therein adapted to receive an adhesive material for locking the threads together.

7. A liner for engine cylinders consisting of a sleeve shaped body having its major portion exteriorly threaded for threaded engagement with the bore of a cylinder, and being of the same external diameter throughout.

8. A liner for engine cylinders consisting of a sleeve threaded throughout for threaded engagement with the bore of a cylinder, and being of the same external diameter throughout.

9. The combination with a cylinder having a bore threaded throughout, of a liner threaded for its full length and engaged with the threads of the cylinder bore, and a securing means between the threads of the cylinder and the threads of the liner.

10. The combination with a cylinder having a threaded bore, of a sleeve threaded into said bore, a portion of the threads on said sleeve being spaced from a portion of the threads on said cylinder thereby forming a spiral space, and a securing means arranged in said spiral space.

ELVIN B. MOOMAW.